US010895985B1

(12) United States Patent
Vasquez et al.

(10) Patent No.: US 10,895,985 B1
(45) Date of Patent: Jan. 19, 2021

(54) REAL-TIME ESTIMATION OF WORKING SETS

(71) Applicant: Amazon Technologies, Inc., Seattle, WA (US)

(72) Inventors: Jorge Peixoto Vasquez, Mercer Island, WA (US); Matthew Graham Baldwin, Edmonds, WA (US); Donavan Miller, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 248 days.

(21) Appl. No.: 15/992,084

(22) Filed: May 29, 2018

(51) Int. Cl.
*G06F 16/00* (2019.01)
*G06F 3/06* (2006.01)
*G06F 12/02* (2006.01)

(52) U.S. Cl.
CPC ............ *G06F 3/0605* (2013.01); *G06F 3/064* (2013.01); *G06F 3/067* (2013.01); *G06F 3/0613* (2013.01); *G06F 3/0622* (2013.01); *G06F 3/0631* (2013.01); *G06F 12/0284* (2013.01); *G06F 2212/1024* (2013.01)

(58) Field of Classification Search
CPC .... G06F 3/0605; G06F 3/0631; G06F 3/0613; G06F 3/064; G06F 3/0622; G06F 3/067; G06F 12/0284; G06F 2212/1024
USPC .......................................................... 707/634
See application file for complete search history.

(56) References Cited

U.S. PATENT DOCUMENTS

| | | | |
|---|---|---|---|
| 6,865,601 B1 * | 3/2005 | Cherkasova | H04L 29/06 709/202 |
| 7,890,933 B2 * | 2/2011 | Smith | G06F 11/3612 717/127 |
| 8,769,202 B1 * | 7/2014 | Soundararajan | G06F 12/0802 711/118 |
| 9,069,680 B2 | 6/2015 | Soundararajan et al. | |
| 9,298,616 B2 * | 3/2016 | Soundararajan | G06F 12/0802 |
| 9,772,794 B2 * | 9/2017 | Li | G06F 3/0617 |
| 9,857,980 B2 * | 1/2018 | Liu | G06F 11/3409 |
| 9,910,768 B1 | 3/2018 | Melekhova et al. | |
| 2015/0269178 A1 * | 9/2015 | Rhodes | G06F 16/958 707/700 |
| 2017/0060769 A1 * | 3/2017 | Wires | H04L 12/6418 |
| 2017/0300489 A1 * | 10/2017 | Qin | G06F 16/2255 |

(Continued)

OTHER PUBLICATIONS

Jake Wires et al., "Counter Stacks and the Elusive Working Set", www.usenix.org, vol. 40 No. 1, Feb. 2015, pp. 1-4.

(Continued)

*Primary Examiner* — Thanh-Ha Dang
(74) *Attorney, Agent, or Firm* — Robert C. Kowert; Kowert, Hood, Munyon, Rankin & Goetzel, P.C.

(57) ABSTRACT

Methods, systems, and computer-readable media for real-time estimation of working sets are disclosed. A plurality of counters are initialized. The counters represent cardinality estimates of data elements accessed for respective time intervals. A request for data is received during the respective time intervals. One or more data elements are determined that are accessed in responding to the request. The counters are updated using the one or more data elements, such that one of the counters is increased by a quantity of the data elements that are accessed for the first time during the respective time interval. The working set estimates for the respective time intervals are determined using the counters.

20 Claims, 7 Drawing Sheets

(56) References Cited

U.S. PATENT DOCUMENTS

2018/0048541 A1* 2/2018 Reilly .................. H04L 43/028
2018/0121237 A1* 5/2018 Crowe ................. G06F 9/4843
2019/0318042 A1* 10/2019 Paul ....................... G06F 17/18

OTHER PUBLICATIONS

S. Heule et al "HyperLogLog in Practice: Algorithmic Engineering of a State of the Art Cardinality Estimation Algorithm," Proceedings of the EDBT 2013 Conference, Association for Computing Machinery, Mar. 2013, pp. 1-10.

* cited by examiner

REAL-TIME ESTIMATION OF WORKING SETS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

A distributed system may provide remote clients with access to various services that are implemented largely within the distributed system and that are accessible via a network such as the Internet. Examples of such systems include online merchants, internet service providers, corporate networks, cloud computing services, web-based hosting services, and so on. Complex systems may include many services that interact with one another in varied ways. For example, a web server may receive requests for web pages and use additional downstream services to build those requested pages. A server may have access to different types of memory in a memory hierarchy, such as cache memory, random access memory (RAM), local disks, remote disks, tapes, and so on. The different types of memory may vary in their speed, cost, and other characteristics.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for real-time estimation of working sets are described. At one or more servers or processes, a working set may be estimated repeatedly, at different intervals, and substantially in real time. The working set for a particular time interval may relate to the aggregate size of data elements that are accessed by a server or process over that time interval. The working set may be estimated for different intervals such as one minute, five minutes, one hour, one day, and so on. The various intervals may overlap, e.g., such that the working set may be estimated for five consecutive one-minute intervals and also for one five-minute interval that occurred at the same time as the five one-minute intervals. In one embodiment, the working set may be estimated using a cardinality estimate for the number of distinct elements in a set of elements. In one embodiment, the cardinality estimate may be probabilistic and may be determined using HyperLogLog techniques. For example, a server may maintain HyperLogLog counters for each current interval, where the counter for a particular duration (e.g., one minute) is reset at the end of each minute. When a request for data is processed or when a work item is performed, the server or process may determine which data elements were accessed. The data elements may represents blocks of a file, and each block may be assigned a unique block identifier comprising a concatenation of the file name and the block number within the file. The block identifiers may be added to the current counters, and the counter for an interval may be increased only if the block identifiers are unique within that interval. The counters may thus represent running estimates of cardinality for accessed data elements over particular time intervals. At the expiration of a counter's interval, the contents of the counter may be used to generate a working set estimate for the interval. In one embodiment, the working set estimate may be generated as a product of the cardinality estimate and a fixed block size of the file blocks. The counter may then be reset to zero for the next interval of the same duration. The real-time working set estimates may be analyzed, summarized in reports, and/or used to tune the various layers of a memory hierarchy.

As one skilled in the art will appreciate in light of this disclosure, embodiments may be capable of achieving certain technical advantages, including some or all of the following: (1) reducing the latency at which working sets may be estimated; (2) reducing the computational, memory, and network resources used for estimating working sets; (3) improving the accuracy of working set estimates by using a different granularity of data elements, particularly blocks within files rather than entire pages of memory; (4) reducing the latency for automatic or manual optimization of systems using the estimated working sets; (5) improving the speed of processing for systems whose memory hierarchies have been optimized using the estimated working sets, and so on.

Figure 1A:
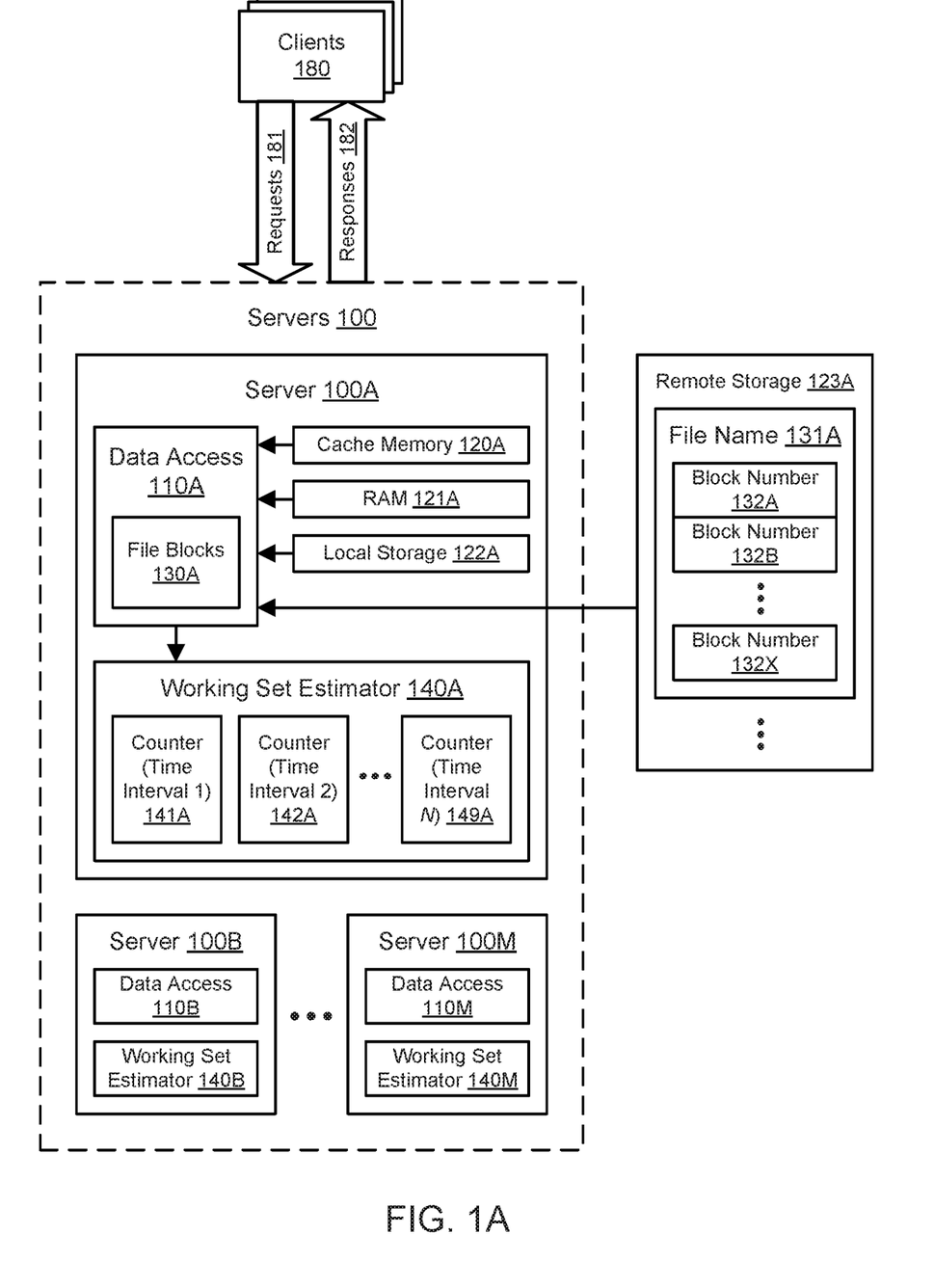
FIG. 1A and FIG. 1B illustrate example system environments for real-time estimation of working sets, according to some embodiments.
Figure 1B:
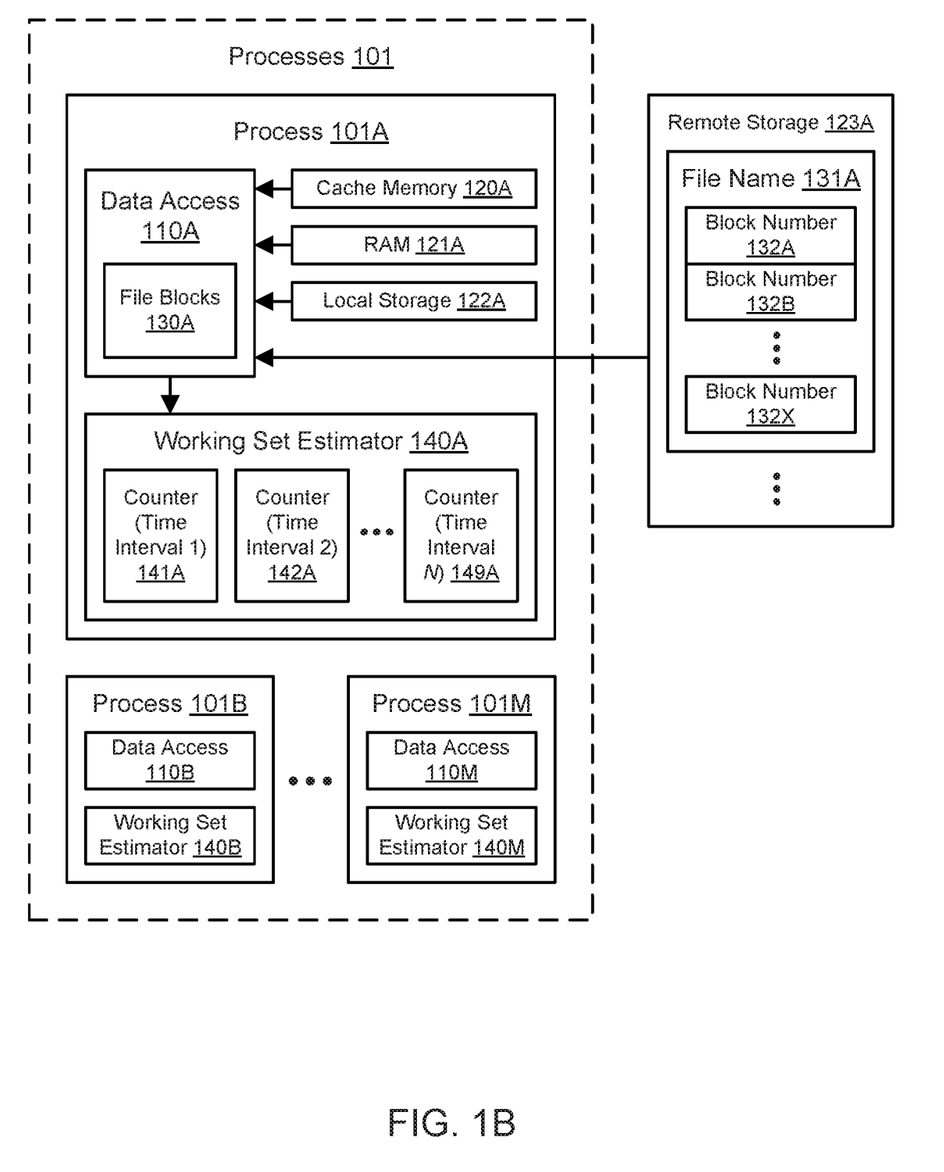

FIG. 1A illustrates an example system environment for real-time estimation of working sets, according to one embodiment. A fleet of servers 100 may accept requests 181 from clients 180, process the requests to generate responses 182, and provide the responses back to the clients. Although three servers 100A, 100B, and 100M are shown for purposes of illustration and example, it is contemplated that any suitable number and configuration of servers may be used. In one embodiment, other types of computing entities may be used in place of the servers 100. The servers 100 may implement processes or services whose functionality is invoked by the requests 181. The various servers 100 may implement the same or similar functionality, e.g., using a load balancing layer or routing layer to direct individual requests to individual servers, or may instead represent distinct functionalities from server to server. FIG. 1B illustrates an example system environment for real-time estimation of working sets for processes, according to one embodiment. A set of processes 101 may perform data access (e.g., using components for data access 110A, 110B, and 110M) in processing a request or processing a work item. Although three processes 101A, 101B, and 101M are shown for purposes of illustration and example, it is contemplated that any suitable number and configuration of processes may be used. Using the techniques described herein, a working set for a server or process may be estimated repeatedly, at intervals that vary in duration, at different intervals simultaneously, and substantially in real time.

In one embodiment, a working set indicates the amount of memory required by a particular process or computing entity over an interval of time. The contents of the memory associated with the working set may be used by the process or entity during the time interval, e.g., as input to tasks initiated during the time interval. In one embodiment, the working set may suggest or indicate what units of information should be kept in main memory to expedite the execution of a process. In prior approaches to using working sets, the units of information to be referenced by a process were often memory pages. In one embodiment, the units of information for a working set may represent a different granularity, such as blocks of data that are smaller than typical memory pages, e.g., such that numerous blocks may be stored in a single page, or blocks of data that are larger than typical memory pages. In one embodiment, using the working set model, a process can be in random access memory (RAM) if and only if all of the pages that the process is currently using (e.g., as approximated by the most recently used pages) can be in RAM; if the number of required pages increases, and there is no room in RAM, then the process may be swapped out of memory so that other processes may use that memory. By accurately estimating a working set for a process or entity, that process or entity may be allowed to make optimal use of memory resources over future occurrences of the time interval corresponding to the working set. In one embodiment, by accurately estimating a working set, different types of memory in a memory hierarchy may then be properly sized for a particular process. For example, a memory hierarchy of a server 100A may include, from order of fastest to slowest and more costly to less costly: a cache memory 120A for the server's processor (s), RAM 121A associated with the server's processor(s), locally accessible persistent storage 122A (e.g., one or more local hard disks and/or flash memory devices), and remotely accessible persistent storage 123A (e.g., as provided by network-accessible storage devices and/or network-accessible storage services).

Prior approaches for estimating working sets have been relatively slow to compute and have been performed after the fact, e.g., using logs generated by servers. Using the systems and methods described herein, working sets may be estimated quickly and in real-time or near-real-time while minimizing the use of computational and memory resources. In one embodiment, working sets may be estimated for different arbitrary time intervals for the same process (e.g., a web server process) or computing entity (e.g., a web server). For example, the working set for a process or server may be determined repeatedly for a one-second interval, a five-second interval, one-minute interval, a five-minute interval, a one-hour interval, and/or a twenty-four-hour interval.

In the processing of requests 181 and/or performing other tasks, a server 100A may perform data access 110A, e.g., to obtain data usable to generate responses 182 to the requests or to process work items. Similarly, in performing various tasks, a process 101A may perform data access 110A to obtain data usable for the tasks. As noted above, a server 100A or process 101A may have access to various types of memory and storage such as cache memory 120A, RAM 121A, local persistent storage 122A, and remote persistent storage 123A. In one embodiment, any of these memory and storage elements 120A, 121A, 122A, and 123A may provide elements of data for the data access 110A. In one embodiment, data elements from the remote storage 123A may be copied to the local storage 122A. In one embodiment, data elements from the local storage 122A may be copied to the RAM 121A prior to the data access 110A. In one embodiment, data elements from the RAM 121A may be copied to the cache 120A prior to the data access 110A.

In one embodiment, the data elements obtained in the data access 110A may represent file blocks 130A. A file accessed by a server or process may include constituent blocks. For example, a file having file name 131A may include a set of blocks that are generally of a fixed block size (e.g., except for a final block, which may be smaller). The blocks may be numbered consecutively, e.g., as block number 132 and, block number 132B through block number 132X, and so on. In one embodiment, each block may be assigned a unique block identifier. For example, a block identifier may include or be generated using a concatenation of the file name 131A and the block number of the block within the file. The unique block identifiers of the file blocks 130A may be used to determine the working sets for various time intervals. If an entire file is needed for processing a request, then the block identifiers for all of the blocks of that file may be used to estimate the working sets for the current time intervals. However, if only a portion of a file's blocks are needed, then the block identifiers for only that portion may contribute to the estimation of working sets.

In one embodiment, a working set may be determined using a cardinality estimate for the number of distinct elements (such a file blocks) in a set of elements. In one embodiment, the cardinality estimate may be probabilistic because calculation of the exact cardinality may require an impractical amount of memory for very large data sets. In one embodiment, the cardinality estimate may use a HyperLogLog algorithm. In one embodiment, the HyperLogLog algorithm may apply a hash function to each element in the original multiset to obtain a multiset of uniformly distributed random numbers with the same cardinality as the original multiset. In one embodiment, the cardinality of this randomly distributed set may then be estimated by calculating the maximum number of leading zeros in the binary representation of each number in the set. For example, if the maximum number of leading zeros observed is n, an estimate for the number of distinct elements in the set may be 2n. In one embodiment, using the HyperLogLog algorithm, the variance may be minimized by splitting the multiset into numerous subsets, calculating the maximum number of leading zeros in the numbers in each of the subsets, and using a harmonic mean to combine the estimates for each subset into an estimate of the cardinality of the whole set.

In one embodiment, the HyperLogLog algorithm may use three primary operations: an add operation (to add a new element to the set), a count operation (to obtain the cardinality of the set), and a merge operation (to obtain the union of two sets). In one operation, the data of the HyperLogLog algorithm may be stored in an array M of counters called registers with size m that are set to 0 in their initial state. In one embodiment, the add operation may include computing the hash using a hash function h of the input data v, getting the first b bits (where b is $\log_2(m)$), and adding 1 them to obtain the address of the register to modify. With the remaining bits, the add operation may compute $\rho(w)$ which returns the position of the leftmost 1. The new value of the register may be the maximum between the current value of the register and $\rho(w)$. The add operation may be associated with the following definitions:

$x := h(v)$ $j := 1 + \langle x_1, x_2, \ldots x_b \rangle_2$ $w := x_{b+1} x_{b+2} \ldots$ $M[j] := \max(M[j], \rho(w))$ In one embodiment, the count operation may include computing the harmonic mean of the m registers, where the constant $\alpha_m$ may correct a systematic multiplicative bias present in $m_2 Z$ due to potential hash collisions:

$$Z = \left( \sum_{j=1}^{m} 2^{-M[j]} \right)^{-1}$$

$$\text{count} = \alpha_m m^2 Z$$

In one embodiment, the merge operation for two Hyper-LogLogs ($hll_1, hll_2$) may include obtaining the maximum for each pair of registers (j: 1 . . . m):

$hll_{union}[j] = \max(hll_1[j], hll_2[j])$

Using a working set estimator 140A at a particular server 100A, working sets may be estimated for different arbitrary time intervals for the same process or computing entity, e.g., at a one-second interval, a five-second interval, a one-minute interval, a five-minute interval, a one-hour interval, and/or a twenty-four-hour interval. The working set estimator 140A may maintain a set of counters that represent cardinality estimates for file blocks 130A (or other data elements) over respective time intervals. For example, the working set estimator 140A may include a counter 141A for a first time interval, a counter 142A for a second time interval, a counter 149A for another time interval, and so on. The time intervals for the various counters 141A-149A may differ in duration. For example, the counter 141A may represent a cardinality estimate for file blocks accessed or loaded into memory during the current one-minute interval, the counter 142A may represent a cardinality estimate for file blocks accessed or loaded into memory during the current five-minute interval, the counter 149A may represent a cardinality estimate for file blocks accessed or loaded into memory during the current twenty-four-hour interval, and so on. As shown in FIG. 1A, the other servers 100B-100M may also include working set estimators 140B-140M based on data access 110B-110M. Similarly, as shown in FIG. 1B, the other processes 101B-101M may also include working set estimators 140B-140M based on data access 110B-110M. In one embodiment, the durations of the different intervals may be configurable, and any of servers 100A-100M or processes 101A-101M may maintain a different number of counters and/or counters for different durations of time.

In one embodiment, HyperLogLog techniques may be used to implement and update the counters 141A-149A. In one embodiment, a single HyperLogLog (HLL) counter may be created for every time interval for a particular server 100A or process 101A. For every request for an object that is received by the server 100A or process 101A, or for every work item to be processed, the server or process (e.g., using the data access component 110A) may compute which blocks of data (e.g., blocks of 64K or any other suitable size) have been accessed. In one embodiment, the server 100A or process 101A may then add every one of the blocks to all of the HLL counters, where a counter is incremented for a unique block and not incremented for a block that has previously been accessed during the interval. Each object may include a set of blocks having sequential block numbers, and blocks may be added by concatenating the object name and block number into a unique block identifier. In one embodiment, for each second (or other suitably brief time period), the server 110A or process 101A may iterate through its HLL counters and determine if any are overdue. An HLL counter may be overdue if it has last been reset more than its duration ago. For any counter that is overdue, the server 100A or process 101A may emit the cardinality multiplied by the block size as the working set metric for that period and then clear the counter.

Figure 6:
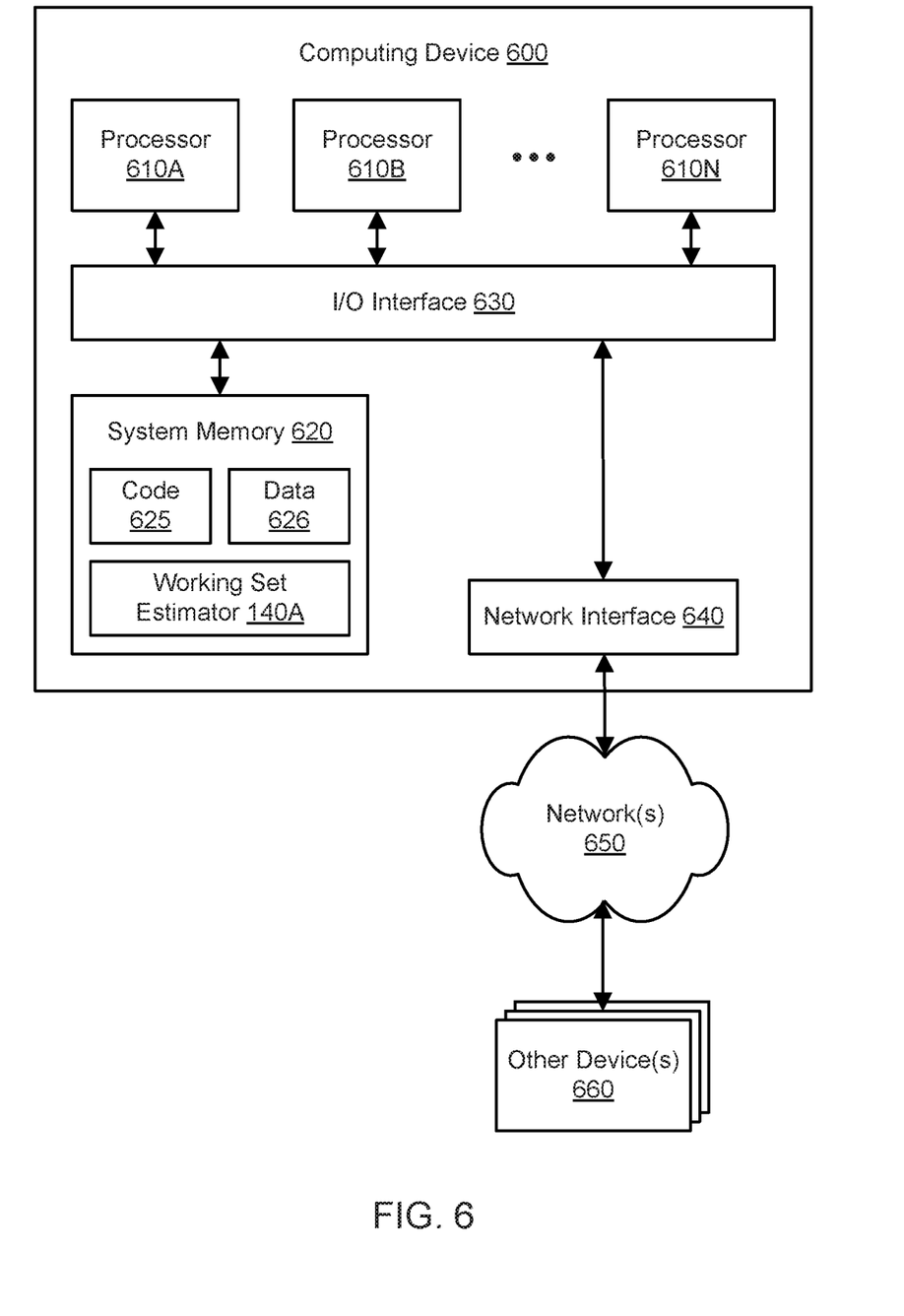
FIG. 6 illustrates an example computing device that may be used in some embodiments.

The servers 100 and processes 101 may be implemented using any suitable number and configuration of computing devices, any of which may be implemented by the example computing device 600 illustrated in FIG. 6. The computing devices may be located in any suitable number of data centers or geographical locations. In various embodiments, at least some of the functionality of the servers 100 or processes 101 may be provided by the same computing device or by different computing devices. If any of the components of the servers 100 or processes 101 are implemented using different computing devices, then the components and their respective computing devices may be communicatively coupled, e.g., via one or more networks. Each of the components of the servers 100 may represent any combination of software and hardware usable to perform their respective functions, as discussed as follows. Operations implemented by the servers 100 or processes 101 may be performed automatically, e.g., without a need for user initiation or user intervention after an initial configuration stage, and programmatically, e.g., by execution of program instructions on at least one computing device. It is contemplated that the servers 100 or processes 101 may include additional components not shown, fewer components than shown, or different combinations, configurations, or quantities of the components shown.

The servers 100 or processes 101 may be implemented in a service-oriented system in which multiple services collaborate according to a service-oriented architecture. In such an environment, the servers 100 or processes 101 may offer their functionality as service to multiple clients 180. A service may be implemented using a plurality of different instances that are distributed throughout one or more networks, and each instance may offer access to the functionality of the corresponding service to various clients 180. It is contemplated that any suitable number and configuration of clients 180 may interact with the servers 100 or processes 101. To enable clients 180 to invoke their functionality, the servers 100 may expose any suitable interface(s), such as one or more APIs or other programmatic interfaces and/or graphical user interfaces (GUIs). In one embodiment, the functionality of the servers 100 or processes 101 may be offered to the client(s) 180 in exchange for fees.

One or more of the clients 180 may represent external devices, systems, or entities with respect to any services or components of the servers 100 or processes 101. The client device(s) 180 may be implemented using any suitable number and configuration of computing devices, any of which may be implemented by the example computing device 600 illustrated in FIG. 6. Clients 180 may convey network-based service requests to the servers 100 or processes 101 via one or more networks, e.g., to supply the requests 181. In various embodiments, the network(s) may encompass any suitable combination of networking hardware and protocols necessary to establish network-based communications between client device(s) 180 and the servers 100 or processes 101. For example, the network(s) may generally encompass the various telecommunications networks and service providers that collectively implement the Internet. The network(s) may also include private networks such as local area networks (LANs) or wide area networks (WANs) as well as public or private wireless networks. For example, both a given client device and the servers 100 or processes 101 may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the servers 100 or processes 101. It is noted that in some embodiments, client devices 180 may communicate with the servers 100 or processes 101 using a private network rather than the public Internet.

In one embodiment, aspects of the servers 100 or processes 101 and clients 180 may be implemented using computing resources of a provider network. A provider network may represent a network set up by an entity such as a company or a public sector organization to provide one or more services (such as various types of network-accessible computing or storage) accessible via the Internet and/or other networks to a distributed set of clients. A provider network may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. Because resources of the provider network may be under the control of multiple clients (or tenants) simultaneously, the provider network may be said to offer multi-tenancy and may be termed a multi-tenant provider network.

In some embodiments, an operator of the provider network may implement a flexible set of resource reservation, control, and access interfaces for their clients. For example, a resource manager may implement a programmatic resource reservation interface (e.g., via a web site or a set of web pages) that allows clients (potentially including other components within the provider network) to learn about, select, purchase access to, and/or reserve compute instances offered by the provider network. Such an interface may include capabilities to allow browsing of a resource catalog and provide details and specifications of the different types or sizes of resources supported, the different reservation types or modes supported, pricing models, and so on.

The provider network may support several different purchasing modes (which may also be referred to herein as reservation modes) in one embodiment: for example, long-term reservations, on-demand resource allocation, or spot-price-based resource allocation. Using the long-term reservation mode, a client may make a low, one-time, upfront payment for a resource instance, reserve it for a specified duration such as a one-year or three-year term, and pay a low hourly rate for the instance; the client may be assured of having the reserved instance available for the term of the reservation. Using on-demand mode, a client could pay for capacity by the hour (or some appropriate time unit), without any long-term commitments or upfront payments. In the spot-price mode, a client could specify the maximum price per unit time that it is willing to pay for a particular type of resource, and if the client's maximum price exceeded a dynamic spot price determined at least in part by supply and demand, that type of resource would be provided to the client. In some embodiments, dynamically resizable pools of resource instances may be set aside for the different reservation types or modes: e.g., long-term reserved instances may be allocated from one pool, on-demand instances from another, and so on. During periods when the supply of the requested resource type exceeds the demand, the spot price may become significantly lower than the price for on-demand mode. In some implementations, if the spot price increases beyond the maximum bid specified by a client, a resource allocation may be interrupted: i.e., a resource instance that was previously allocated to the client may be reclaimed by the resource manager and may be allocated to some other client that is willing to pay a higher price. Other purchasing modes or combinations of modes may be implemented by the resource manager in some embodiments.

Figure 2:
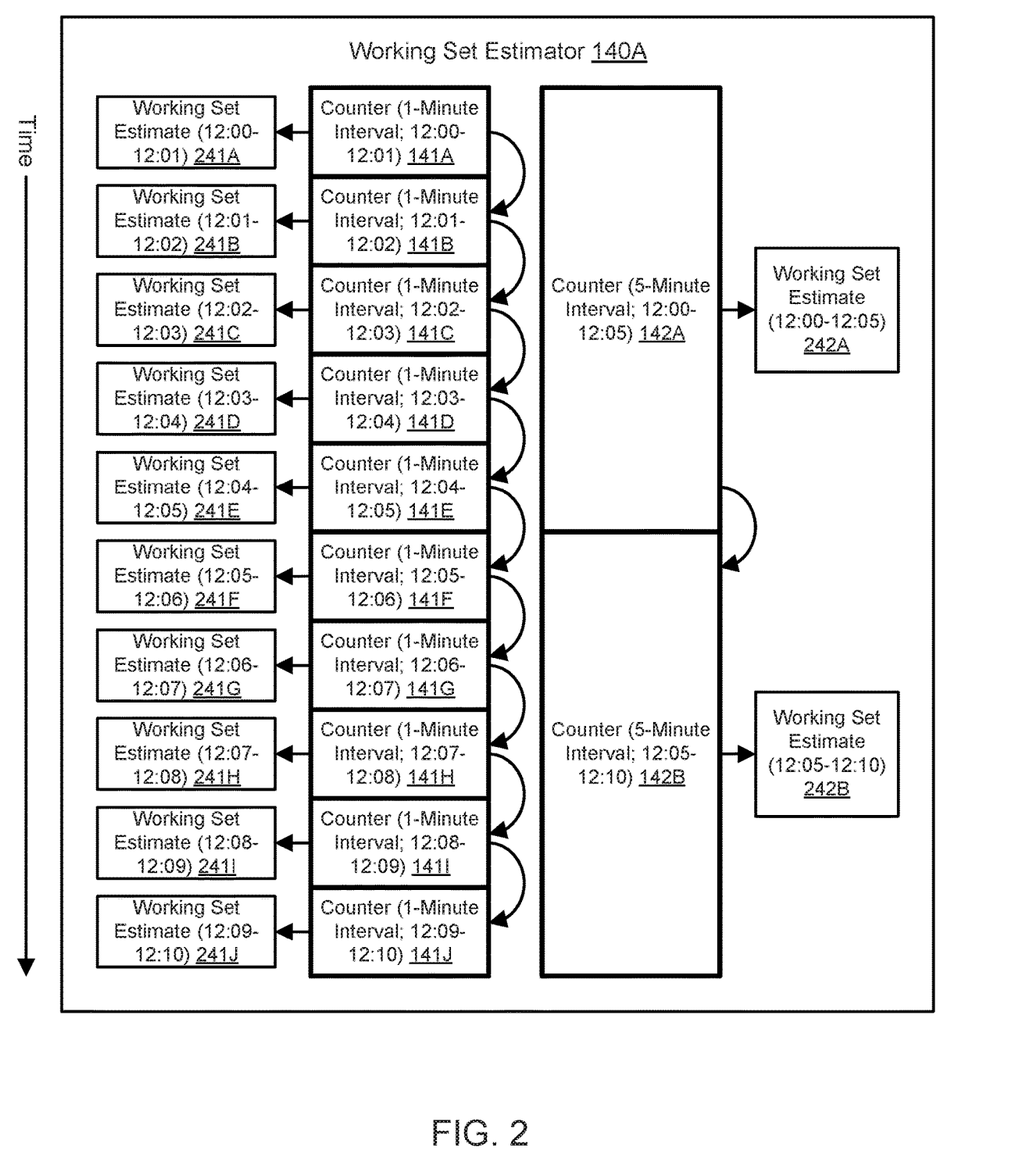
FIG. 2 illustrates further aspects of the example system environment for real-time estimation of working sets, including an example of cardinality counters for time intervals of different durations, according to one embodiment.

FIG. 2 illustrates further aspects of the example system environment for real-time estimation of working sets, including an example of cardinality counters for time intervals of different durations, according to one embodiment. As noted above, a working set estimator 140A for a server 100A or process 101A may simultaneously maintain cardinality counters for different time intervals. As shown in the example of FIG. 2, the counters may include a one-minute counter and a five-minute counter. The interval represented by the one-minute counter may overlap with the interval represented by the five-minute counter. At or after the expiration of the current interval, the working set estimate for that interval may be output based on the content of the counter, and the counter may be reset to zero for the next interval. For example, over a ten-minute period indicated by the "time" arrow in FIG. 2, the counter for the one-minute interval may be reused again and again, from the first minute 141A to the second minute 141B to the third minute 141C to the fourth minute 141D to the fifth minute 141E to the sixth minute 141F to the seventh minute 141G to the eighth minute 141H to the ninth minute 141I to the tenth minute 141J. A series of working set estimates 241A, 241B, 241C, 241D, 241E, 241F, 241G, 241H, 241I, and 241J may be generated for each respective one-minute interval. Similarly, over the same ten-minute period indicated by the "time" arrow in FIG. 2, the counter for the five-minute interval may be reset once, from the first five-minute interval 142A to the second five-minute interval 142B. Working set estimates 242A and 242B may be generated for each respective five-minute interval. Additionally, time intervals measured in hours or days may also be represented by cardinality counters that are maintained simultaneously with the counter 141A-141J and the counter 142A-142B. The working set estimates may be generated by multiplying the cardinality estimate represented in a counter by the block size of file blocks, thus yielding an estimate of the size of memory needed by a server or process for that particular time interval. In one embodiment, the cardinality and the working set for a shorter interval of time may generally be smaller than the cardinality and the working set for a longer interval of time, as more unique items are typically accessed by a server over a longer period.

Figure 3:
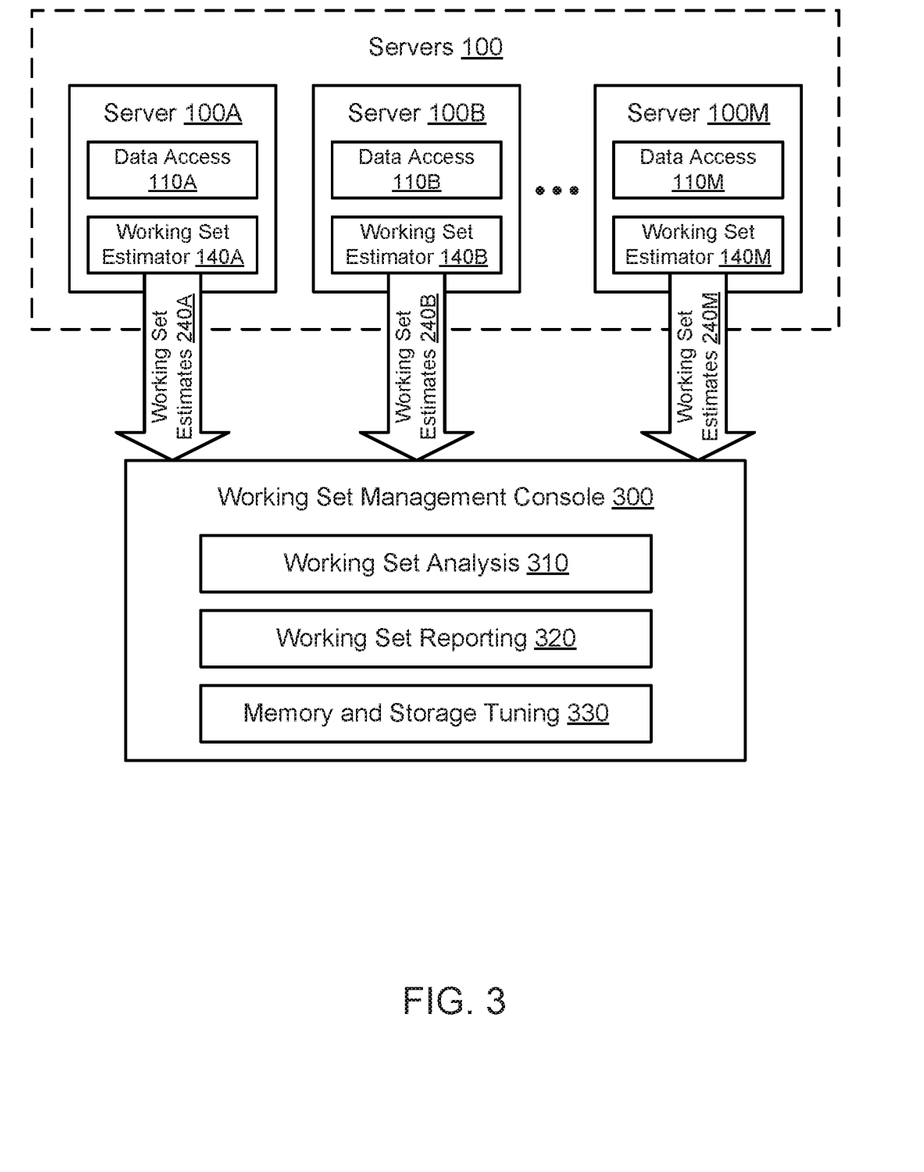
FIG. 3 illustrates further aspects of the example system environment for real-time estimation of working sets, including the output of working set estimates to a centralized component for analysis and reporting, according to one embodiment.

FIG. 3 illustrates further aspects of the example system environment for real-time estimation of working sets, including the output of working set estimates to a centralized component for analysis and reporting, according to one embodiment. In one embodiment, various ones of the servers 100 (or processes 101) may report their working set estimates to a centralized component. As shown in the example of FIG. 3, a working set management console 300 may receive working set estimates 240A from server 100A, working set estimates 240B from server 100B, working set estimates 240M from server 100M, and so on. The working set estimates 240A-240M may be provided repeatedly over a period of time, e.g., by being batched at a respective server and sent via a network when the batch size is sufficient. The console 300 may be implemented using any suitable number and configuration of computing devices, any of which may be implemented by the example computing device 600 illustrated in FIG. 6. The console 300 may be located in any suitable data center(s) or geographical location(s) relative to the servers 100.

The console 300 may perform a variety of tasks with respect to the working set estimates 240A-240M. In one embodiment, the console 300 may provide a user interface (e.g., a graphical user interface) that permits a user to browse working set estimates 240A-240M. In one embodiment, the console 300 may include a component for working set analysis 310 that may generate per-server or per-fleet metrics regarding working sets. For example, the working set analysis 310 may generate a visualization of working set estimates for consecutive five-minute time intervals for a particular server, e.g., in order to show how the working set changes over time as different workloads are encountered. As another example, the working set analysis 310 may generate a graph of working set estimates for consecutive one-minute time intervals and also for overlapping five-minute time intervals for a particular server. As yet another example, the working set analysis 310 may generate a summary of working set estimates for multiple servers in the fleet 100. In one embodiment, the console 300 may present such visualizations, graphs, summaries, and other reports to a user with a component for working set reporting 320. The working set reporting 320 may be interactive, such that a user may select which time intervals, servers, and/or report types to view. In one embodiment, the working set reporting 320 may also be configured send alarms to registered users if particular conditions are detected, e.g., if a working set for a particular server exceeds a predetermined threshold for its time interval.

Figure 4:
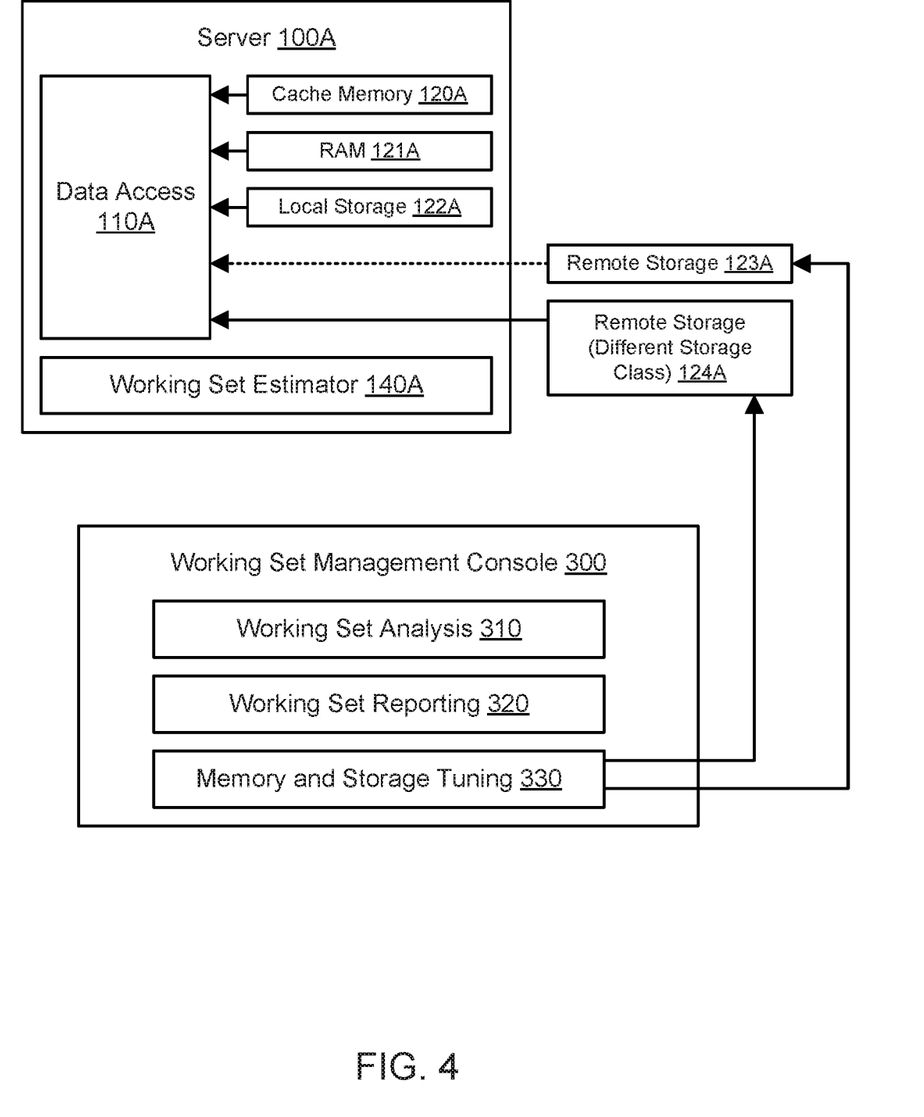
FIG. 4 illustrates further aspects of the example system environment for real-time estimation of working sets, including the use of working set estimates to perform memory and storage tuning, according to one embodiment.

FIG. 4 illustrates further aspects of the example system environment for real-time estimation of working sets, including the use of working set estimates to perform memory and storage tuning, according to one embodiment. In one embodiment, the console 300 may include a component for memory and storage tuning 330. Based on the analysis 310 of working set estimates 240A-240M, the console 300 may be used to modify aspects of the memory hierarchy of one or more servers or processes. The memory hierarchy may include different types of memory and storage that vary in performance characteristics (e.g., speed of access) and/or cost. As discussed above, a memory hierarchy of a server 100A may include, from order of fastest to slowest and more costly to less costly: a cache memory 120A for the server's processor(s), RAM 121A associated with the server's processor(s), locally accessible persistent storage 122A (e.g., one or more local hard disks and/or flash memory devices), and remotely accessible persistent storage 123A (e.g., as provided by network-accessible storage devices and/or network-accessible storage services). The console 300 may modify the size or configuration of any of these layers of the hierarchy in order to optimize performance of the server 100A for anticipated workloads, as captured in the working set estimates. For example, as shown in FIG. 4, the remote storage 123A may be made inaccessible to the server 100A, while another class of remote storage 124A may be made accessible instead. The different classes of remote storage 123A and 124A may differ in their latency, security, cost, and/or other performance characteristics, and the replacement of remote storage class 123A by remote storage class 124A may improve the performance of storage access and/or reduce the cost of storage access for the server 100A. Aspects of the memory and storage tuning 330 may be manual (as determined by user input) and/or automatic (as determined by execution of program instructions at the console, potentially without user input). As an example of manual tuning of the server 100A, a user may install additional RAM or remove RAM from the server in response to the working set estimates for the server.

Figure 5:
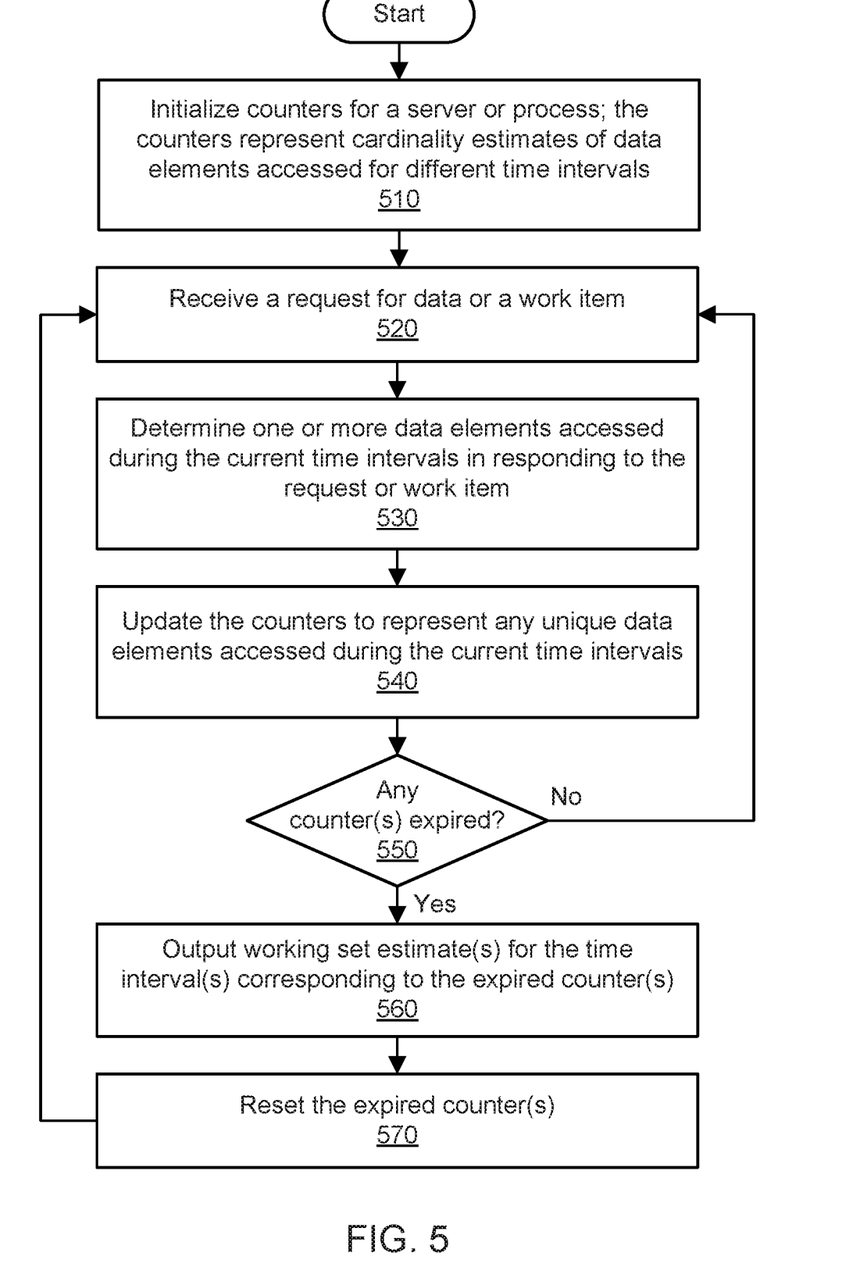
FIG. 5 is a flowchart illustrating a method for real-time estimation of working sets, according to one embodiment.

FIG. 5 is a flowchart illustrating a method for real-time estimation of working sets, according to one embodiment. As shown in 510, a set of counters may be initialized at a server or process. The counters may represent cardinality estimates of data elements accessed for different time intervals. For example, one counter may correspond to a one-minute interval, another counter may correspond to a five-minute interval, yet another counter may correspond to a one-hour interval, and so on. Counters may also be used for smaller intervals (e.g., one second or five seconds) or larger intervals. The time intervals may overlap at least partially, e.g., such that a one-minute interval corresponding to one counter occurs during a five-minute interval corresponding to another counter. Any suitable number of counters may be used to represent different durations of time. Initializing a counter may include setting the value of the counter to zero. A counter may be again be set to zero after the expiration of its time interval. A counter may be used again and again for consecutive time intervals, e.g., such that a one-minute counter may be reset to zero approximately every minute.

As shown in 520, a request for data or a work item may be received at the server or process. A work item may represent an individual task in a list or set of tasks to be performed by the server or process. The request may be received over a network from a client. In processing the request or work item, the server or process may access particular data elements, e.g., by loading them into RAM or cache memory. For example, the request may be for the server to provide a web page, and the server may access particular data objects (by loading them into memory) in generating the requested web page. As another example, the request may be to provide one or more data objects to the client, and the server may access those data objects (by loading them into memory).

As shown in 530, the server or process may determine one or more data elements accessed during the current time intervals corresponding to the counters. The data elements may be accessed in responding to the request. In one embodiment, the data elements may represent file blocks of a file accessed by the server or process. The blocks may be numbered consecutively, and each accessed block may be assigned a unique block identifier comprising a concatenation of the file name and the block number of the block within the file. The use of unique block identifiers may assist in using the counters to represent accurate cardinality estimates for accessed file blocks.

As shown in 540, the current counters for the current intervals may be updated to represent any unique data elements accessed in responding to the request. In one embodiment, a counter may represent a cardinality estimate for the number of distinct elements (such as file blocks) accessed during the time interval of the counter. In one embodiment, the cardinality estimate may be probabilistic because calculation of the exact cardinality may require an impractical amount of memory for very large data sets. The currently accessed file blocks may be added to the counters for the current time intervals. If an entire file is needed for processing a request, then the block identifiers for all of the blocks of that file may added to the counters for the current time intervals. However, if only a portion of a file's blocks are needed, then the block identifiers for only that portion may contribute to the counters. In one embodiment, a HyperLogLog algorithm may be used to update the counters. In one embodiment, using HyperLogLog operations, the current counters may be increased only for data elements that have not been previously accessed during the corresponding interval.

As shown in 550, the method may determine whether any counters have expired. If not, then the method may proceed to 520 to await other requests from clients or other work items. If so, then as shown in 560, a working set estimate may be generated and output for any counter whose interval has expired. For example, a counter for a one-minute interval may expire approximately every minute. In one embodiment, a working set indicates the amount of memory required by a particular process or computing entity over an interval of time. The contents of the memory associated with the working set may be used by the process or entity during the time interval, e.g., as input to tasks initiated during the time interval. A working set estimate for a time interval may be generated by multiplying the value of the counter (representing the cardinality of accessed file blocks) at the expiration of the interval by the maximum block size of the file blocks. As shown in 570, any expired counters may be reset, such that the value is dropped back down to zero. In one embodiment, the operation shown in 560 may be performed prior to the expiration of the counter. For example, the contents of a counter may be accessed before the expiration of the corresponding time interval in order to extrapolate and provide an estimate for the entire interval.

Illustrative Computer System

In at least some embodiments, a computer system that implements a portion or all of one or more of the technologies described herein may include a computer system that includes or is configured to access one or more computer-readable media. FIG. 6 illustrates such a computing device 600. In the illustrated embodiment, computing device 600 includes one or more processors 610A-610N coupled to a system memory 620 via an input/output (I/O) interface 630. Computing device 600 further includes a network interface 640 coupled to I/O interface 630.

In various embodiments, computing device 600 may be a uniprocessor system including one processor or a multiprocessor system including several processors 610A-610N (e.g., two, four, eight, or another suitable number). Processors 610A-610N may include any suitable processors capable of executing instructions. For example, in various embodiments, processors 610A-610N may be processors implementing any of a variety of instruction set architectures (ISAs), such as the x86, PowerPC, SPARC, or MIPS ISAs, or any other suitable ISA. In multiprocessor systems, each of processors 610A-610N may commonly, but not necessarily, implement the same ISA.

System memory 620 may be configured to store program instructions and data accessible by processor(s) 610A-610N. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 620 as code (i.e., program instructions) 625 and data 626. In the illustrated embodiment, system memory 620 also stores program code and data that implement the working set estimator 140A discussed above.

In one embodiment, I/O interface 630 may be configured to coordinate I/O traffic between processors 610A-610N, system memory 620, and any peripheral devices in the device, including network interface 640 or other peripheral interfaces. In some embodiments, I/O interface 630 may perform any necessary protocol, timing or other data transformations to convert data signals from one component (e.g., system memory 620) into a format suitable for use by another component (e.g., processors 610A-610N). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processors 610A-610N.

Network interface 640 may be configured to allow data to be exchanged between computing device 600 and other devices 660 attached to a network or networks 650. In various embodiments, network interface 640 may support communication via any suitable wired or wireless general data networks, such as types of Ethernet network, for example. Additionally, network interface 640 may support communication via telecommunications/telephony networks such as analog voice networks or digital fiber communications networks, via storage area networks such as Fibre Channel SANs, or via any other suitable type of network and/or protocol.

In some embodiments, system memory 620 may be one embodiment of a computer-readable (i.e., computer-accessible) medium configured to store program instructions and data as described above for implementing embodiments of the corresponding methods and apparatus. For example, system memory 620 may store program code and data associated with the working set estimator 140A. In some embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 600 via I/O interface 630. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 600 as system memory 620 or another type of memory. Further, a computer-readable medium may include transmission media or signals such as electrical, electromagnetic, or digital signals, conveyed via a communication medium such as a network and/or a wireless link, such as may be implemented via network interface 640. Portions or all of multiple computing devices such as that illustrated in FIG. 6 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more computing devices configured to implement a working set estimator, wherein the working set estimator is configured to:
initialize a plurality of counters associated with a server, wherein the counters represent cardinality estimates of data elements accessed for respective time intervals;
determine one or more data elements accessed during the respective time intervals;
update the plurality of counters using the one or more data elements, wherein one of the counters is increased by a quantity of the one or more data elements that are accessed for the first time during the respective time interval;
determine working set estimates for the respective time intervals using the counters, wherein the counters are reset after expiration.

2. The system as recited in claim 1, wherein the one or more data elements represent one or more blocks of data within one or more files, wherein the blocks are added to the counters using unique block identifiers comprising file names and block numbers, and wherein the working set estimates represent quantities of blocks.

3. The system as recited in claim 1, wherein the counters comprise HyperLogLog counters.

4. The system as recited in claim 1, wherein a memory hierarchy of the server is tuned using the working set estimates, wherein the memory hierarchy comprises a plurality of different memory types that differ in performance characteristics.

5. A method performed by one or more computing devices, comprising:

maintaining a plurality of counters, wherein the counters represent cardinality estimates of data elements accessed for respective time intervals;
determining one or more data elements accessed during the respective time intervals;
updating the plurality of counters using the one or more data elements; and
determining working set estimates for the respective time intervals using the counters.

6. The method as recited in claim 5, wherein the one or more data elements represent one or more blocks of data within one or more files, wherein the blocks are added to the counters using unique block identifiers comprising file names and block numbers, and wherein the working set estimates represent quantities of blocks.

7. The method as recited in claim 5, wherein the counters comprise probabilistic cardinality counters.

8. The method as recited in claim 5, wherein the one or more data elements are accessed by a server, wherein a memory hierarchy of the server is tuned using the working set estimates, and wherein the memory hierarchy comprises a plurality of different memory types that differ in performance characteristics.

9. The method as recited in claim 5, wherein the working set estimates are determined at or after expiration of the respective time intervals, and wherein the counters are reset after the expiration.

10. The method as recited in claim 5, wherein one of the counters is increased by a quantity of the one or more data elements that are accessed for the first time during the respective time interval.

11. The method as recited in claim 5, wherein at least two of the time intervals differ in duration and at least partially overlap.

12. The method as recited in claim 5, wherein one of the working set estimates is determined by multiplying a cardinality estimate of data blocks accessed during a corresponding time interval by a block size of the data blocks.

13. A non-transitory computer-readable storage medium storing program instructions computer-executable to perform:
initializing a plurality of counters, wherein the counters represent cardinality estimates of data elements accessed for respective time intervals;
determining one or more data elements accessed during the respective time intervals in responding to a request or in processing a work item;
updating the plurality of counters using the one or more data elements; and
determining working set estimates for the respective time intervals using the counters.

14. The non-transitory computer-readable storage medium as recited in claim 13, wherein the one or more data elements represent one or more blocks of data within one or more files, wherein the blocks are added to the counters using unique block identifiers comprising file names and block numbers, and wherein the working set estimates represent quantities of blocks.

15. The non-transitory computer-readable storage medium as recited in claim 13, wherein the counters comprise HyperLogLog counters.

16. The non-transitory computer-readable storage medium as recited in claim 13, wherein the one or more data elements are accessed by a process, wherein a memory hierarchy of the process is tuned using the working set estimates, and wherein the memory hierarchy comprises a plurality of different memory types that differ in performance characteristics.

17. The non-transitory computer-readable storage medium as recited in claim 13, wherein the working set estimates are determined at or after expiration of the respective time intervals, and wherein the counters are reset after the expiration.

18. The non-transitory computer-readable storage medium as recited in claim 13, wherein one of the counters is increased by a quantity of the one or more data elements that are accessed for the first time during the respective time interval.

19. The non-transitory computer-readable storage medium as recited in claim 13, wherein at least two of the time intervals differ in duration and at least partially overlap.

20. The non-transitory computer-readable storage medium as recited in claim 13, wherein the program instructions are further computer-executable to perform:
generating a report indicative of the working set estimates for one or more servers or processes.

* * * * *